United States Patent [19]

BeVan

[11] Patent Number: 4,999,782
[45] Date of Patent: Mar. 12, 1991

[54] FIXED CURVED PATH WAYPOINT TRANSITION FOR AIRCRAFT

[75] Inventor: Erik T. BeVan, Glendale, Ariz.
[73] Assignee: Honeywell Inc., Minneapolis, Minn.
[21] Appl. No.: 347,108
[22] Filed: May 3, 1989
[51] Int. Cl.[5] .......................... G05D 1/08; B64C 13/16
[52] U.S. Cl. ..................................... 364/448; 364/447; 364/444; 364/439
[58] Field of Search ............... 364/448, 444, 445, 446, 364/447, 449, 439, 433

[56] References Cited

U.S. PATENT DOCUMENTS

| | | | |
|---|---|---|---|
| 3,414,901 | 12/1968 | Peckins et al. | 364/447 |
| 3,534,367 | 10/1970 | Laughlin et al. | 364/439 |
| 3,777,123 | 12/1973 | Games | 364/447 |
| 3,778,601 | 12/1973 | Brock et al. | 364/447 |
| 3,994,456 | 11/1976 | Pest et al. | 364/448 |
| 3,998,412 | 12/1976 | Baker et al. | 364/439 |
| 4,021,009 | 5/1977 | Baker et al. | 364/433 |
| 4,354,240 | 10/1982 | Olive | 364/447 |
| 4,812,990 | 3/1989 | Adams et al. | 364/444 |

*Primary Examiner*—Michael R. Fleming
*Assistant Examiner*—Ayaz Sheikh
*Attorney, Agent, or Firm*—D. E. Jepsen; R. W. Jensen; A. Medved

[57] ABSTRACT

Control apparatus for an aircraft area navigation system provides transitioning from an inbound leg to an outbound leg of a lateral navigation waypoint with a fixed curved transition path with or along the outer limit of the protected airspace width or PAW. The present invention determines in conjunction with the aircraft altitude and the angle of the course change a maximum distance that the aircraft will deviate from either the inbound or outbound leg. This distance is sometimes called the maximum cross track error or MXTK. The maximum cross track error information in conjunction with the course change angle is used to generate a turn radius for a fixed curved transition path to be followed by the aircraft independent of ground speed. The turn radius information together with the aircraft ground speed information is used to generate a bank angle bias command signal. The bank angle bias command is calculated to vary the bank angle of the aircraft so as to keep the aircraft on the fixed curved path throughout the transition from outbound to inbound waypoint legs.

24 Claims, 5 Drawing Sheets

FIXED CURVED PATH WAYPOINT TRANSITION FOR AIRCRAFT

BACKGROUND

This invention generally relates to aircraft area navigation which includes an omnidirectional radio range and bearing transmitter, referred to hereafter as VORTAC, located at various ground stations which can define waypoints along the course of an aircraft flight plan and particularly to aircraft radio navigation systems which control lateral transitions of the aircraft from an inbound course to an outbound course within the limits of controlled airspace around the waypoints.

Many of today's aircraft are equipped with radio navigation systems which include a flight management computer which among other things provides for both vertical and lateral navigation of the aircraft. In the lateral navigation mode the computer functions to navigate and guide the aircraft along a flight plan made up of a series of waypoints connected by courses defining point to point legs of the flight plan. Air traffic control regulations specify the protected airspace width on either side of such legs. The regulations also specify both an enroute zone and terminal zone which further defines the width of the protected airspace. The width of the protected airspace in a terminal zone being much narrower than the width of the protected airspace in the enroute zone. For example, the present regulations specify that the protected airspace width of the enroute zone is four nautical miles, while the protected airspace width of the terminal zone is two nautical miles. In the present invention, for example, the enroute zone width restriction applies to aircraft flying above 18,000 feet of altitude while the terminal zone width restriction applies to aircraft flying at or below 18,000 feet of altitude.

In today's heavy air traffic environment most flight plans contain multiple waypoints between origin and destination. Each of these waypoints defines a flight plan leg. The aircraft must then transition between each leg of the flight plan from the origin to the destination.

The problem at each of these transitions is to keep the aircraft confined within the protected airspace width while at the same time minimizing the aircraft bank angle in the interest of passenger comfort.

In prior lateral course transition systems such as that disclosed in U.S. Pat. No. 3,994,456 assigned to the assignee of the present invention, the transition apparatus first chooses a bank angle command based on the course change at a given waypoint and together with the ground speed of the aircraft calculates a turn radius based on the bank angle command and the aircraft ground speed. An arc having the calculated turn radius is fitted into the waypoint corner defined by the inbound and the outbound legs of that waypoint. The arc is fitted such that the arc is tangent with each of the legs. If the ground speed changes before the aircraft enters the transition arc, the turn radius is recalculated and a new arc is fitted into the waypoint corner.

Although the above described apparatus has performed in an acceptable fashion in the past, the current airspace restrictions around a waypoint are not fully addressed, since the prior apparatus does not provide information about the protected airspace width. Therefore, the prior apparatus does not utilize all of the available airspace which results in aircraft bank angles larger than necessary and the aircraft taking a longer than necessary transition path. In addition, if there is a change in ground speed while the aircraft is in the transition arc the aircraft can overshoot the protected airspace outer boundaries of the outbound leg of the waypoint. All the foregoing disadvantages of the prior apparatus can lead to passenger discomfort, increased fuel usage, and an increase in travel time.

The present invention overcomes the foregoing problems by providing an aircraft transitioning from an inbound leg to an outbound leg of a lateral navigation waypoint with a fixed curved transition path within or along the outer limit of the protected airspace width. The present invention determines in conjunction with the aircraft altitude and the angle of the course change a maximum distance that the aircraft will deviate from either the inbound or outbound leg. This distance is sometimes called the maximum cross track error or MXTK. The maximum cross track error information in conjunction with the course change angle is used to generate a turn radius for a fixed curved transition path to be followed by the aircraft independent of ground speed. The turn radius information together with the aircraft ground speed information is used to generate a bank angle bias command signal. The bank angle bias command is calculated to vary the bank angle of the aircraft so as to keep the aircraft on the fixed curved path throughout the transition from inbound to outbound waypoint legs.

Thus it is appreciated that the above described problems are eliminated in a manner as described hereinafter and that further advantages and details of the invention can be had from the following description and claims taken together with the accompanying drawing.

DETAILED DESCRIPTION

Figure 1:
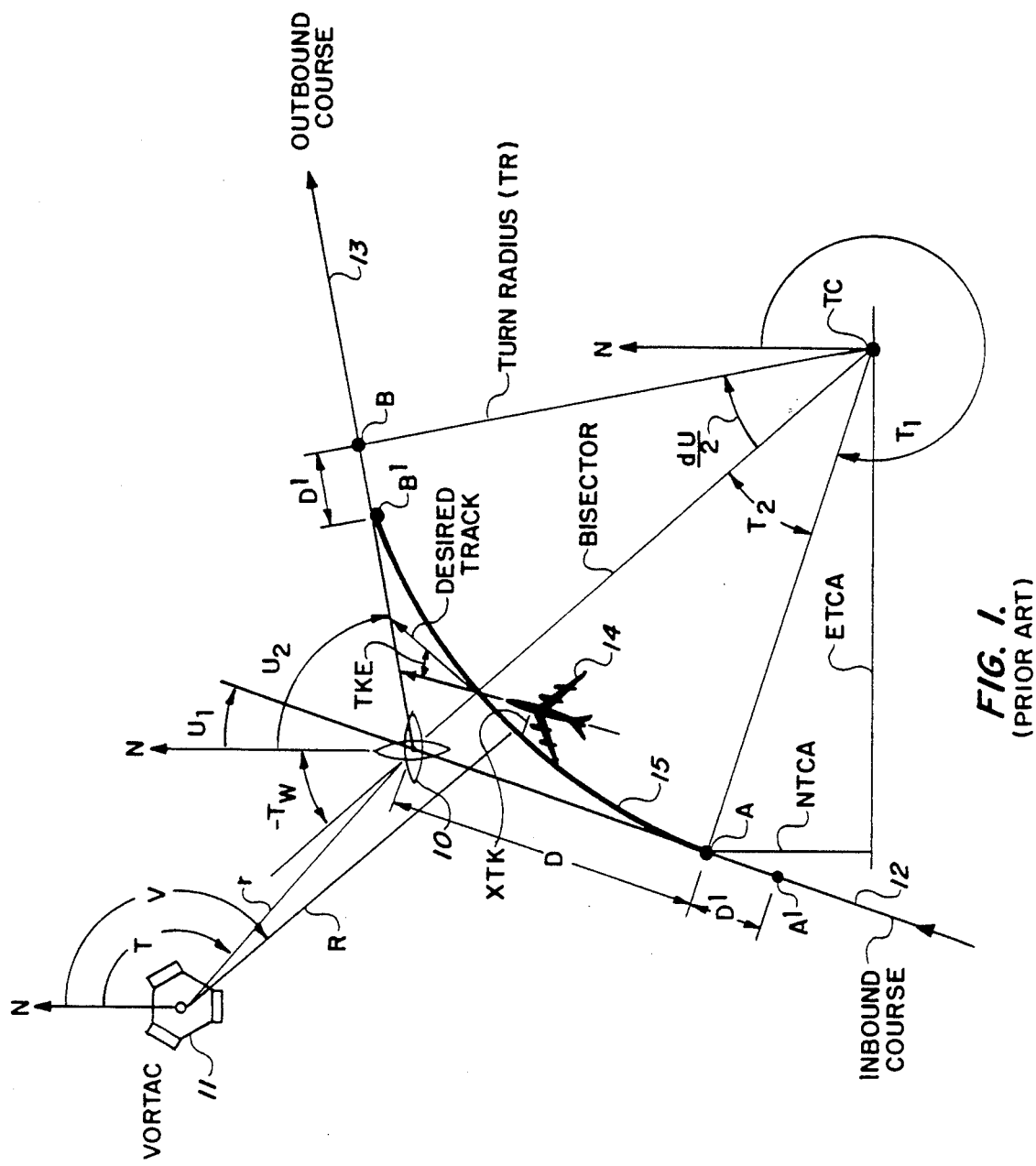
FIG. 1 is a diagram illustrating geometrical parameters with regard to the fixed curved path waypoint transition from an inbound course to an outbound course at such a waypoint.
Figure 2:
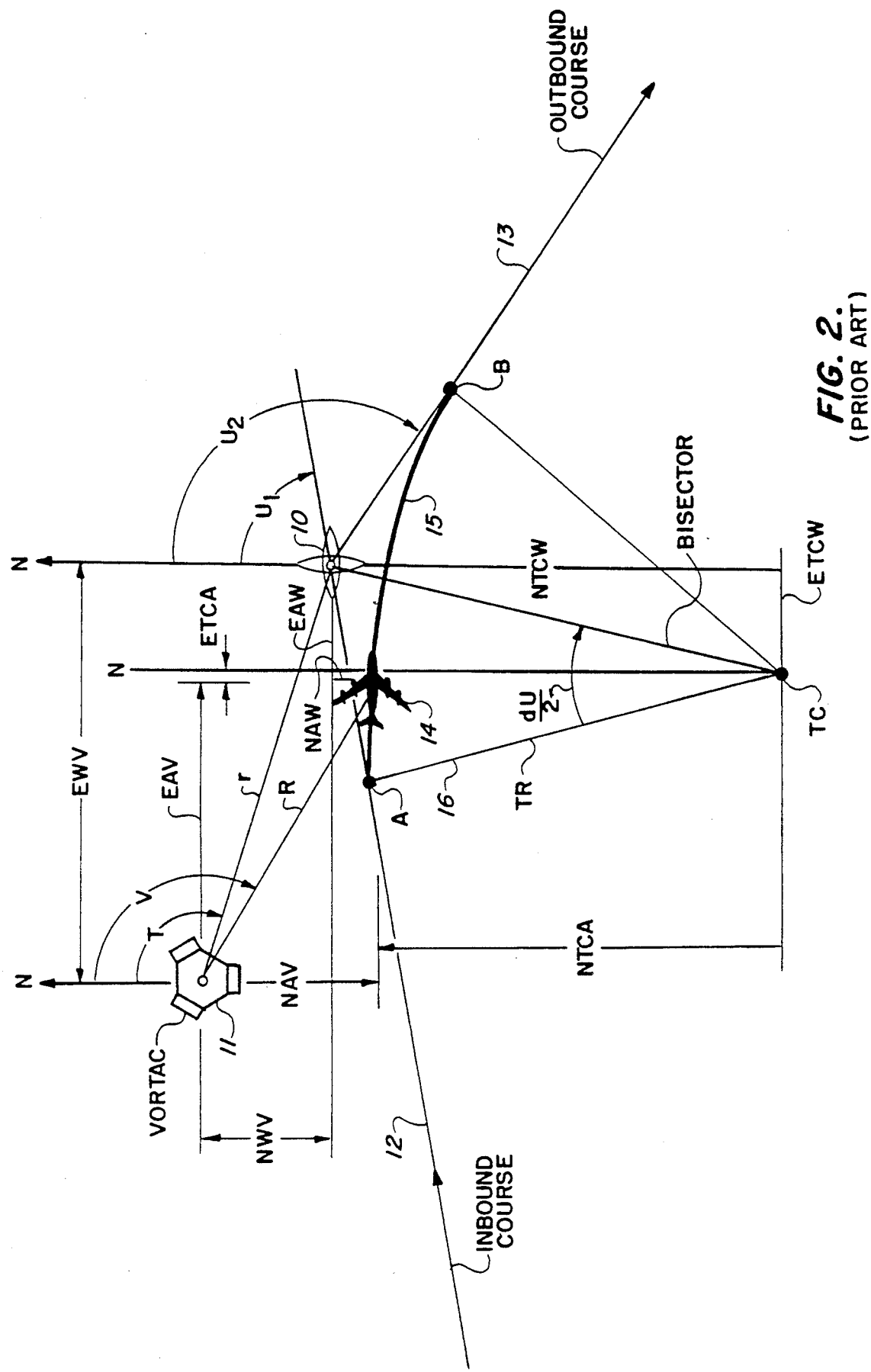
FIG. 2 is a diagram similar to FIG. 1 illustrating further geometrical parameters.

Referring to FIGS. 1 and 2, the lateral navigation parameters associated with transitioning from an inbound course 12 to the outbound course 13 of a waypoint 10 which can be defined, for example by a VORTAC 11, is illustrated. Waypoint 10, whose geographical location is determined in a well known manner by the distance and bearing coordinates r, T with respect to VORTAC 11, has inbound course 12 and outbound course 13 associated therewith. The inbound and outbound courses 12 and 13 with respect to North are designated as $U_1$ and $U_2$ respectively. The geographical location of an aircraft 14 is determined from the VOR- TAC 11 in a conventional manner by the VOR/DME receivers (FIG. 4) and indicated as the R, V coordinates illustrated in FIGS. 1 and 2. The north and east components of the locations of the waypoint 10, the VORTAC 11 and the aircraft 14 with respect to each other are also illustrated. For example, the north and east coordinates of the aircraft 14 with respect to VORTAC 11 are indicated in FIG. 2 as NAV and EAV respectively. Similarly the north and east coordinates of the waypoint 10 with respect to the VORTAC 11 are designated as NWV and EWV respectively. Furthermore, NAW and EAW designate the north and east coordinates of the aircraft 14 with respect to the waypoint 10.

Figure 3:
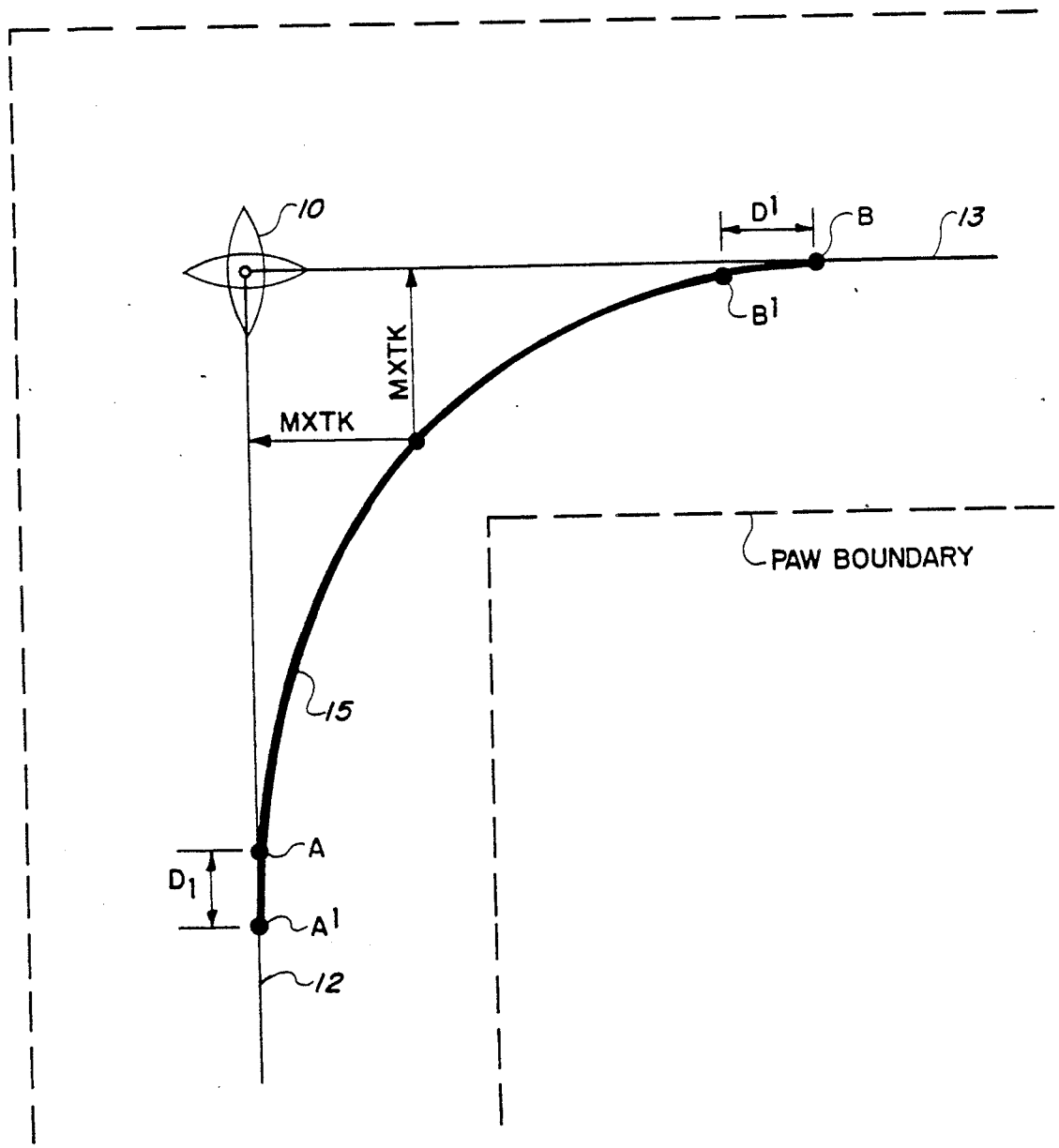
FIG. 3 is a diagram of a fixed curved path waypoint transition showing the protected airspace width and the maximum aircraft deviation distance around such waypoint.

In accordance with the invention, a fixed curved path 15 is generated along which to fly the aircraft 14 to effect a smooth and controlled transition from the inbound course 12 to the outbound course 13 by using the maximum cross track error or MXTK, FIG. 3 around waypoint 10. Preferably the fixed curved path 15 is circular and tangential to the inbound and outbound courses 12 and 13 at points A and B respectively. An aircraft bank angle bias command $P_m$ FIG. 4, for the transition is determined as a function of aircraft ground speed VG and the transition turn radius TR. The distance D is then determined which locates the point A on the inbound course 12 and in combination with the turn radius TR locates the turn center TC for the fixed curved path 15.

In order for the aircraft 14 to fly the path 15, the aircraft bank attitude is established at point A with the aircraft returning to zero bank attitude at point B. However, since the aircraft 14 cannot be rolled into and out of the bank attitude instantaneously, the associated aircraft roll command is applied and removed at points A' and B' respectively. The distances D' from the points A' and B' are determined from considerations of passenger comfort and aircraft roll response which is determined in accordance with the specific aircraft to which the invention is applied.

With the aircraft 14 at the commanded bank angle at point A, the craft heading rate maintains the aircraft on the curved path 15 in an idealized calm air environment. However, due to winds, velocity changes, trim conditions, and the like, the aircraft 14 can deviate from the curved path 15. In order to correct for these deviations the cross track error XTK and the track angle error TKE with respect to the curved path 15 are generated to steer the aircraft and provide pilot displays in a manner to be described. For ease of illustration with regard to FIG. 1, the aircraft 14 is often considered to be located at point A. Thus the north and east coordinates of the aircraft 14 with regard to the turn center are designated in FIG. 2 as NTCW and ETCW designate the north and east components of the turn center with respect to the waypoint 10.

Figure 4:
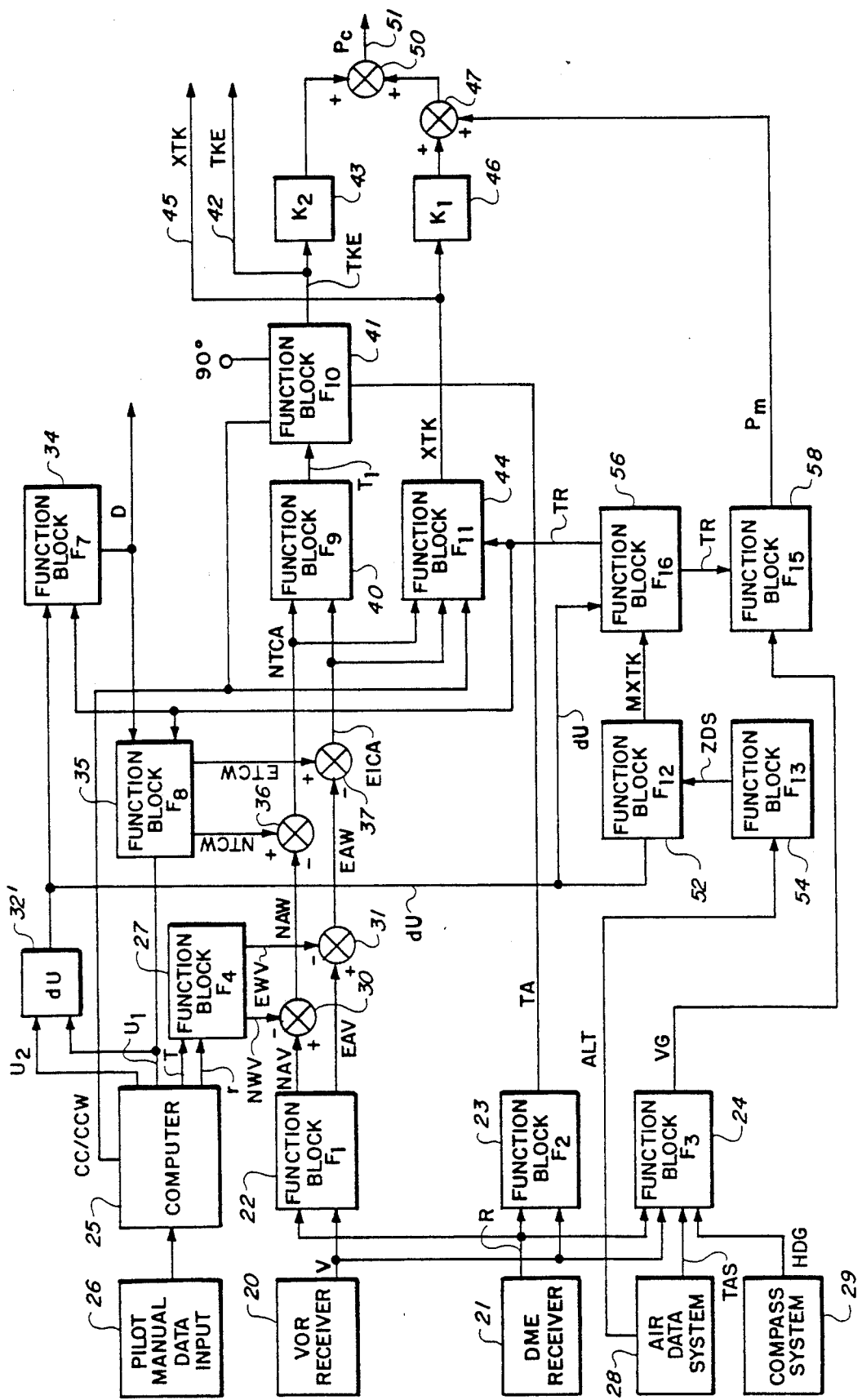
FIG. 4 is a schematic block diagram of a fixed curved path waypoint transition generation and control apparatus for an aircraft in accordance with the invention.

Referring to FIG. 4 with continued reference to FIGS. 1 and 2, a schematic block diagram of apparatus for generating the curved path 15 and for controlling the aircraft 14 to fly therealong in transitioning from the inbound course to the outbound course of the waypoint 10, is illustrated. The apparatus of FIG. 4 includes a plurality of function blocks that may be implemented by any of a variety of well known devices. For example, the function blocks may be implemented by special purpose discrete analog or digital circuits or may alternatively be implemented by general purpose digital computation apparatus.

A VOR receiver 20 provides the VOR bearing V and a DME receiver 21 provides the DME distance R in response to the signals from the VORTAC 11. The distance R and bearing data V are applied to a function block 22 wherein a well known coordinate conversion function $F_1$ which converts the VOR V and DME R data to the north coordinate NAV and east coordinate EAV, of the aircraft with respect to the VORTAC 11. Circuits for providing the function $F_1$ are well known in the art and will not be described further herein for brevity. The VOR V and DME R data are also applied to function blocks 23 and 24 wherein conventional circuitry implementing functions $F_2$ and $F_3$ provide the track angle TA and the ground speed VG respectively of the aircraft 14. It will be appreciated that aircraft heading HDG from a conventional compass system 29 and true airspeed TAS from a conventional air data system 28 may be utilized as inputs to the function block 24 thereby generating a current and accurate value of the ground speed VG. The function $F_3$ of the block 24 may be implemented as disclosed in U.S. Pat. No. 3,919,529 entitled "Radio Navigation System" and assigned to the assignee of the present invention.

Additionally, the air data system 28 may be utilized to obtain a current aircraft altitude information signal ALT and is used as an input to function $F_{13}$ of block 54. Function $F_{13}$ of block 54 generates an aircraft altitude zone designation signal ZDS in response to the functional relationship $F_{13}$ which is formulated in accordance with airspace utilization regulations explained below.

Figure 5:
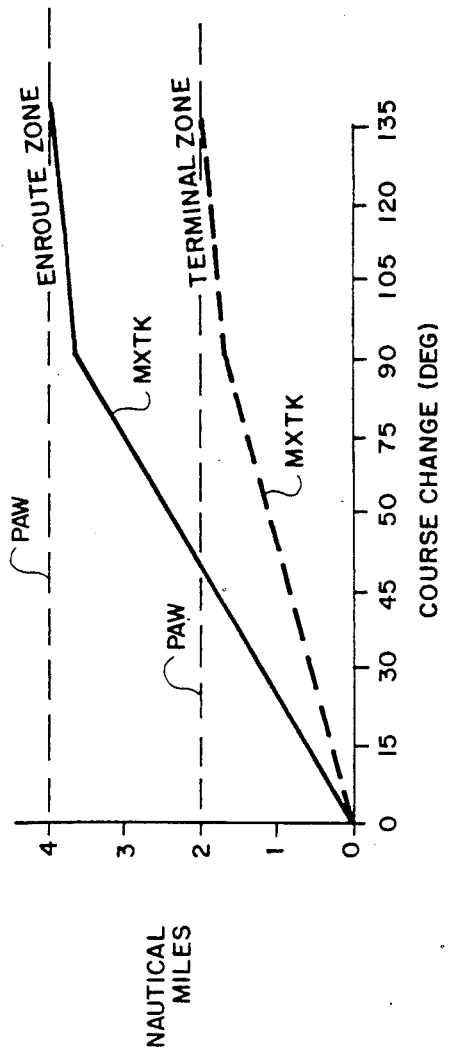
FIG. 5 is a graph depicting the functional relationship between the maximum cross track error and altitude zone, and course change angle at a waypoint.

As shown in FIGS. 3 and 5, and previously explained, the current airspace regulations specify two zones, an enroute zone EZ and a terminal zone TZ and a protected airspace width PAW for each zone. The width PAW for the enroute zone is four nautical miles and for the terminal zone is two nautical miles. The present invention interprets the enroute zone EZ as any altitude above 18,000 feet and the terminal zone TZ as any altitude at or below 18,000 feet.

It will be appreciated from the foregoing that the number of zones and quantities are given as examples only and are not intended as limitations of the present invention. And that these numbers are only interpretations of the current regulations.

The apparatus of FIG. 4 also includes a computer 25 for storing the navigational data with regard to the flight plan of the aircraft. For example, the computer 25 may be preloaded prior to a particular flight with the geographical locations of all of the waypoints along the flight plan as well as the locations of the associated VORTACs. The computer 25 is arranged in a conventional manner to provide the required data as the aircraft executes the flight plan with regard to the sequentially encountered waypoints. For example, with the aircraft on the inbound course 12 of the waypoint 10, the computer 25 provides the pre-stored inbound and outbound courses $U_1$ and $U_2$ respectively for the waypoint 10 as well as the bearing T and distance r of the waypoint 10 with respect to the VORTAC 11. The computer 25 also provides a control signal CCW or CW in accordance whether the turn from the inbound course 12 to the outbound course 13 is counter clockwise or clockwise.

The computer 25 may receive signals from a pilot manual data input device 26 by which the pilot may alter the data stored in the computer 25 or may enter new data therein. The device 26 may, for example, be implemented as a conventional alphanumeric and discrete data keyboard entry device for providing the data to the computer 25 in a well known manner. The device 26 may be utilized, for example, when the pilot wishes to deviate from the flight plan as stored in the computer 25.

The bearing and distance data (T, r) of the waypoint 10 with respect to the VORTAC 11 is applied to a function block 27. The block 27 in a well known manner implements a conventional coordinate conversion function $F_4$ for converting the T,r data to the north and east coordinates NWV and EWV respectively of the waypoint with regard to the VORTAC 11. The signals NAV from the block 22 and NWV from the block 27 are applied to an algebraic summing device 30 to provide the north coordinate NAW of the aircraft 14 with respect to the waypoint 10. Similarly, the EAV signal from the block 22 and the EWV signal from the block 27 are applied to an algebraic summing device 31 to provide the east coordinate EAW of the aircraft 14 with respect to the waypoint 10.

The inbound and outbound course signals $U_1$ and $U_2$ from the computer 25 are applied to a function block 32' that computes the function $dU = U_2 - U_1$. The course change or dU signal from the function block 32' as well as the zone designation signal ZDS from the function block 54 are applied to function block 52. The function block 52 provides the maximum cross track error signal MXTK in accordance with a functional relationship $F_{12}$ shown in FIG. 5 of the track change $dU = U_2 - U_1$ and the zone designation signal ZDS.

The MXTK signal along with the course change signal dU is input into functional block 56 which generates according to function $F_{16}$ a turn radius signal TR. The turn radius signal TR along with the aircraft speed signal VG is input into functional block 58 which in turn generate according to function $F_{15}$ a bank angle bias command signal $P_m$. The bank angle bias command $P_m$ is applied to the aircraft at point A', FIG. 1, such that the aircraft will have assumed the commanded bank angle when it reaches point A, thus causing the craft to execute the fixed curved path 15 in a manner to be described.

It will be appreciated that the maximum cross track error signal generated by the functional relationship $F_{12}$, as shown in FIG. 5, can be expressed as follows:

For $DU < 90°$
and
$ZDS = EZ$ then $MXTK = (k_3)(dU)$
or
$ZDS = TZ$ then $MXTK = (k_4)(dU)$
and
For $90° < dU < 135°$
and
$ZDS = EZ$ then $MXTK = (k_5 + k_6)(dU)$
or
$ZDS = TZ$ then $MXTK = (k_7 + k_8)(dU)$ Wherein
dU = course change signal in degrees
MXTK = maximum cross track error signal in nautical miles
ZDS = zone designation signal
EZ = enroute altitude zone
TZ = terminal altitude zone
$k_3$-$k_8$ = constants for given combination of dU and altitude zone
and implemented by the block 52 in accordance with the relationship as shown by the graph of FIG. 5 wherein the typical protected airspace width PAW, maximum cross track error, course change and altitude zone functional relationships are illustrated. The functional relationships shown in FIG. 5 are readily implemented by such conventional devices as storage tables, diode matrices and the like. It will be appreciated that the block 52 is responsive to the signal $dU = U_2 - U_1$ from the block 32, and this difference signal together with the zone designation signal ZDS from the block 54 addresses the function generating apparatus to provide the associated maximum cross track error signal MXTR as illustrated in FIG. 5.

Referring again to FIG. 4, as previously mentioned the maximum cross track error signal MXTK from the block 52 and the course change signal dU from the block 32, are applied to function block 56 to generate the turn radius signal TR, FIG. 1, for the circular path 15 in accordance with a function $F_{16}$ as follows:

$$F_{16} = TR = MXTK/[1-\text{cosine } (dU/2)]$$

where TR is the turn radius signal. As previously described, it is appreciated that the function $F_{16}$ is readily implemented by a variety of suitable and well known analog and digital circuits.

The dU signal from the function block 32' as well as the turn radius signal TR from the function block 33 are applied to a function block 34 to generate a signal D in accordance with the distance between the point A and the waypoint 10 of FIG. 1. The distance D is generated in accordance with a function $F_7$ as follows:

$$F_7 = D = TR \tan dU/2$$

where, as previously discussed, $dU = U_2 - U_1$. The block 34 is implemented in any convenient manner in accordance with the function $F_7$ as discussed above with regard to the block 56.

The $U_1$ signal from the computer 25, the turn radius TR signal from the function block 56 and the D signal from the function block 34 are applied to a function block 35 to generate the north NTCW and east ETCW coordinates of the turn center TC location with respect to the waypoint 10 as illustrated in FIG. 2, in accordance with a function $F_8$ as follows:

$$F_8 = NTCW = -D \cos U_1 - TR \sin U_1 \text{ for north coordinate}$$

$$F_8 = ETCW = -D \sin U_1 + TR \cos U_1 \text{ for east coordinate}$$

The block 35 is implemented in any convenient manner as described above with respect to the block 56.

The NTCW signal from the block 35 and the NAW signal from the algebraic summing device 30 are combined in an algebraic summing device 36 to provide the NTCA north coordinate of the aircraft location with respect to the turn center TC. In a similar manner, an algebraic summing device 37 combines the ETCW signal from the block 3 with the EAW signal from the algebraic summing device 31 to provide the ETCA coordinate signal of the aircraft location with respect to the turn center. The NTCA and ETCA signals are applied as inputs to a function block 40 wherein the quantity $T_1$ as illustrated in FIG. 1 is generated in accordance with a function $F_9$ as follows:

$$F_9 = T_1 = \tan^{-1}(NTCA/ETCA)$$

where $T_1$ represents the angular position of the aircraft on the curved path 15.

The track angle signal TA from the function block 23, the CW/CCW signal from the computer 25 and the $T_1$ signal from the function block 40, as well as a constant signal representing 90° are applied to a function block 41 to generate the track angle error TKE in accordance with a function $F_{10}$ as follows:

$F10 = TKE = (T_1 - 90°) - TA$ for CCW turns, or, $F10 = TKE = (T_1 + 90°) - TA$ for CW turns The TKE signal is applied to a line 42 as well as to a gain block 43. The gain block 43 applies a gain $k_2$ to the TKE signal in a well known manner, the gain being selected and conventionally adjusted in accordance with the aircraft characteristics and velocity.

The CW/CCW signal from the computer 25, the turn radius signal TR from the function block 56, the NTCA signal from the summing device 36 and the ETCA signal from the summing device 37 are applied to a function block 44 for generating the cross track error signal XTK in accordance with a function $F_{11}$ as follows:

$F_{11} = XTK = (NTCA^2 + ETCA^2)^{\frac{1}{2}} - TR$ for CCW turns, or $F_{11} = XTK = TR - (NTCA^2 + ETCA^2)^{\frac{1}{2}}$ for CW turns The XTK signal is applied to a lead 45 as well as to a gain block 46 which imparts a gain $k_1$ to the XTK signal in a manner similar to that described with respect to the block 43. The gain adjusted XTK signal from the block 46 is combined with the bank angle command signal $P_m$ from the block 58 in an algebraic summing device 47. The output of the algebraic summing device 47 and the gain adjusted TKE signal from the block 43 are combined in an algebraic summing device 50 to provide the system steering signal $P_c$ on a lead 51. The $P_c$ signal may be expressed as follows:

$P_c = P_m + k_1 XTK + k_2 TKE$

Preferably the steering signal $P_c$ on the lead 51 is applied to the roll channel of the aircraft automatic flight control system and also to the lateral steering cue of the attitude director indicator of the flight director system of the aircraft. The track angle error signal TKE on the lead 42 is preferably applied to the commanded heading bug of the horizontal situation indicator instrument of the aircraft while the cross track error signal XTK on the lead 45 is applied to the lateral deviation indicator of the horizontal situation indicator.

In operation, when the aircraft reaches the point A' FIG. 1, as indicated by the signal D from the block 34 and the above discussed predetermined value of D', aircraft control is switched by conventional means, not shown, from the straight line control apparatus for the inbound course 12 (FIG. 1) to the curved path control apparatus of FIG. 4. The $P_m$ signal from the block 58 applied via elements 47 and 50 to the lead 51 causes the aircraft to assume the bank angle $P_m$ at the point A. The bank angle $P_m$ then causes the craft to endeavor to turn about the turn center as determined by the NTCA and ETCA signals from the elements 36 and 37 respectively with a turn radius TR as determined by the block 56. When the aircraft is on the curved path 15 the track angle error signal on the lead 42 and the cross track error signal on the lead 45 are both zero and thus the steering command $P_c$ is equal to the bank angle command $P_m$ which tends to maintain the craft on the curved path 15 by maintaining the craft banked at the angle $P_m$. When the craft departs from the curved path 15, due for example to transients such as wind and the like or aircraft configuration changes, the combination of the track angle error from the block 41 and the cross track error signal from the block 44 combined in the steering command $P_c$ tend to steer the aircraft back to the curved path 15.

When the craft reaches the point B', FIG. 1, as determined from the computed value of D and the predetermined value of D' as discussed above, aircraft control is switched by means not shown from the curved path control apparatus of FIG. 4 to the straight line control apparatus with regard to the outbound course 13 and thus the aircraft rolls back to wings level flight by the time it reaches point B, completing the transition from the inbound course 12 to the outbound course 13 of the waypoint 10.

It will be appreciated that since the cross track error from the block 44 is applied via the lead 45 to the lateral deviation cue of the horizontal situation indicator HSI and since the error is computed with respect to the curved path 15 as the aircraft executes the course transition, it is merely necessary that the pilot maintains the lateral deviation indicator centered in order to make good the desired curved path. Similarly, since the track angle error from the block 41 is applied via the lead 42 to the commanded heading bug of the HSI and the error is computed with respect to the curved path 15, the commanded heading bug remains centered under the index of the HSI as the craft executes the course transition along the curved path 15. The turn rate of the craft along the curved path 15 is displayed to the pilot by reason of the compass card of the HSI slewing under the commanded heading bug at a rate equal to the turning rate of the craft until the new course is achieved at point B of FIG. 1. Thus the present invention guides the aircraft in making turns by utilizing the same steering laws and outputs as when flying straight tracks and, additionally, permits consistent HSI display rules. Thus it is appreciated that the HSI displays to the pilot a clear and uninterrupted presentation of the system performance throughout the transition.

Figure 6:
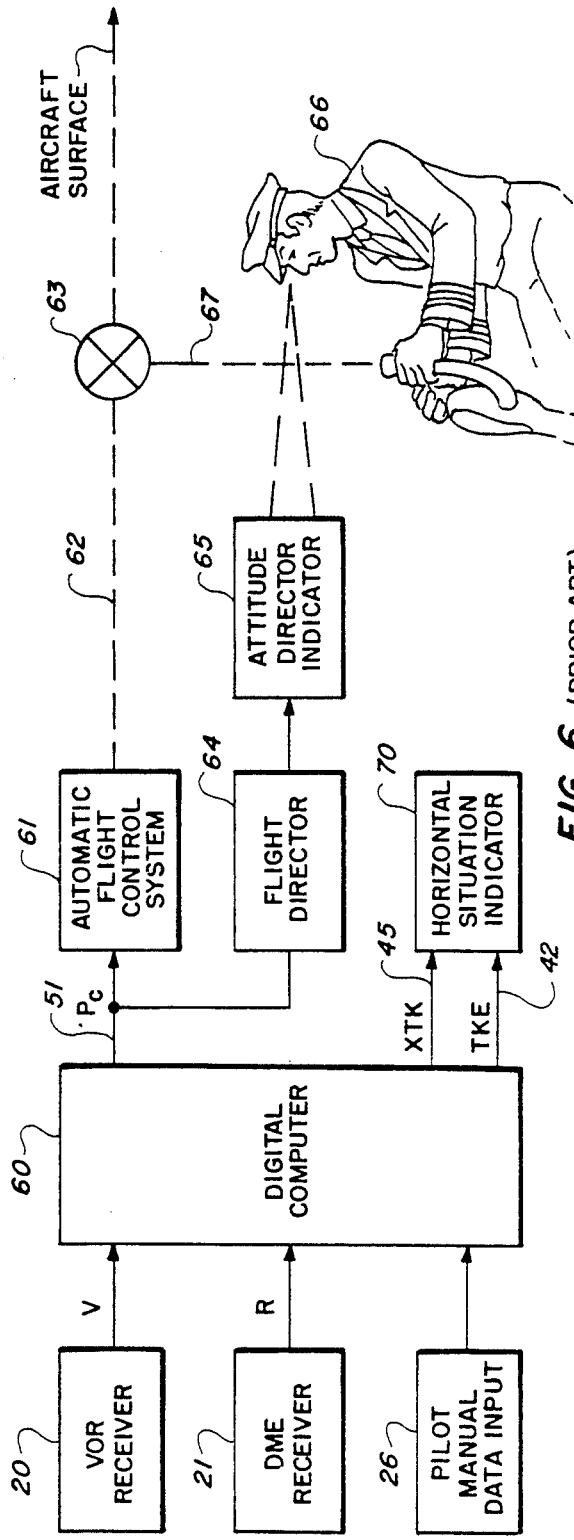
FIG. 6 is a schematic block diagram of an alternative embodiment of the invention.

Referring now to FIG. 6 in which like reference numerals indicate like components with respect to FIG. 4, an alternative embodiment of the invention is illustrated. The VOR receiver 20, the DME receiver 21 and the pilot manual data input device 26 provide inputs to a programmed general purpose digital computer 60, the data inputs from the blocks 20, 21 and 26 being similar to those described above with respect to FIG. 4. It will be appreciated that conventional analog-to-digital converters (not shown) may be utilized at the input interface of the computer 60 where appropriate. The computer 60 is programmed to provide the track angle error signal TKE, the cross track error signal XTK and the steering signal $P_c$ on leads 42, 45 and 51 respectively. The nature and purposes of these signals having been previously described with respect to FIG. 3.

The computer 60 is programmed in a conventional and well known manner to provide the NAV, EAV, track angle and ground speed VG signals as described above from the VOR and DME data. Additionally, in a manner similar to that described above with regard to the computer 25 of FIG. 4, the computer 60 stores the $U_1$, $U_2$, T, r and CCW or CW data with regard to the VORTACs and waypoints of the flight plan. These data may also be altered and supplemented by the pilot manual data input device 26 in the manner previously described. The computer 60 is furthermore programmed in a conventional and well known manner to provide the NWV and EWV signals from the T and r data stored therein.

The steering signal $P_c$ is applied to the roll channel of the automatic flight control system (AFCS) 61 of the aircraft to steer the craft along the curved path 15 of FIG. 1. Accordingly, the output of the AFCS 61 is applied through appropriate linkages 62 and a mechanical summing device 63 to control the aircraft roll attitude surfaces. The steering signal $P_c$ is also applied to the aircraft flight director 64 which includes the conventional attitude director indicator 65 with the roll command signal $P_c$ being applied to the lateral steering cue of the attitude director indicator 65. In a conventional manner the pilot 66 applies manual control signals via appropriate control and linkages 67 to steer the aircraft along the curved path 15 by maintaining the lateral steering cue of the attitude director indicator 65 centered in a well known manner.

The cross track error signal XTK on the lead 45 and the track angle error signal TKE on the lead 42 are applied to the horizontal situation indicator (HSI) 70 of the aircraft. The cross track error signal is applied to the lateral deviation bar and the track angle error signal is applied to the commanded heading bug of the HSI 70. It will be appreciated that the pilot 66, in addition to his being appraised of the horizontal situation of the aircraft by observation of the instrument 70, may also utilize the displayed information to steer the aircraft along the curved path 15 of FIG. 1 via the controls and linkages 67. For example, by maintaining the commanded heading bug centered under the HSI index and maintaining the lateral deviation bar centered, the aircraft is steered to make good the curved path 15.

It will be appreciated from the foregoing that the elements of the above described embodiments of the invention that generate the turn center, turn radius and $T_1$ parameters comprise means for generating a curved path with respect to the inbound and outbound courses of the waypoint. It will furthermore be appreciated that the elements for generating the cross track and track angle errors as well as the steering signal $P_c$ comprise means for generating deviation signals with regard to the curved path for steering the aircraft therealong.

It is further appreciated from the foregoing that by utilizing the present invention during leg switching at a navigation waypoint the aircraft is guided through the transition using a fixed curved path. The cross track error and track angle error are computed with respect to the fixed curved path and are utilized in computing the bank command $P_c$ for the AFCS and the flight director. Since utilizing the track angle and cross track errors with respect to the curved path would result in a zero bank command when the aircraft is making good the path, the bank angle bias command signal $P_m$ is mixed with the computation at the point A' assuring that the aircraft maintains the proper bank angle when making good the fixed curved path. The bank angle bias command is removed at the point B' and the cross track and track angle errors with respect to the outbound track are utilized for the computations resulting in a steering signal that rolls the aircraft level at the point B in a smooth transition from the fixed curved path to the next leg. Since the cross track and track angle errors are computed with respect to the predetermined curved path and are displayed on the HSI, the pilot is permitted to maintain the lateral deviation and heading command bug aligned, thereby allowing for manual leg-to-leg transitions without overshoot or undershoot of the next leg. Therefore, aircraft radio navigation systems utilizing the present invention provide controlled guidance during the transition from one leg to the next of the aircraft flight plan. By thus providing a fixed curved path turn, the pilot is better able to maintain cognizance of his position when transitioning from one track to another, especially if track changes occur often, as in terminal areas with an accurately controlled circular transition path at or within the protected airspace width PAW. This type of controlled guidance is a requirement of aviation regulatory agencies for aircraft radio navigation systems to provide accurate spacing of aircraft during turns as well as on straight legs.

Thus the present invention achieves steering the aircraft through a waypoint transition using a predetermined turning radius which computes a fixed curved transition path utilizing the maximum allowable airspace which results in a minimal bank angle for passenger comfort.

Additionally, the fixed curved transition path of the present invention is completely predictable because the invention calculates the parameters for the turn radius of an arc based on the geometry of the transition to utilize more of the protected airspace width for a given enroute or terminal zone. Aircraft ground speed only effects the aircraft bank angle and not the transition path followed by the aircraft. Because the path is not speed dependent the along track distance is known before the aircraft enters the curved path. Since the turn radius of the present invention is at the maximum cross track error, the along track distance that the aircraft flies is shorter than prior systems thereby reducing fuel consumption and time in transitioning between inbound and outbound legs of a waypoint.

In addition, by flying a fixed curved path defined by the maximum cross track error signal the aircraft having the present invention will not exceed the protected airspace width during waypoint course changes.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An apparatus for transitioning an aircraft from an inbound course to an outbound course of a waypoint, said waypoint surrounded by a regulated band of airspace within which a travel of inbound and outbound air traffic is constrained to fly, said apparatus comprising:
   a. curved path means for computing a fixed circular transition path from said inbound course to said outbound course, said transition path being tangential to said inbound and said outbound courses,
   b. bank bias means for generating a bank angle command signal for maintaining said aircraft on said fixed circular path, c. deviation means generating deviation correction signals with respect to said fixed circular path for constraining said aircraft to fly along said fixed circular path in transitioning from said inbound to said outbound course, and d. altitude signal generating means for generating an altitude signal representative of the altitude of said aircraft, wherein said curved path means comprises, maximum cross track error means for generating a maximum cross track error signal representative of a maximum deviation allowable from said inbound and outbound courses based on said altitude signal, turn radius means generating a turn radius signal for said fixed circular path in accordance with said maximum cross track error signal, turn center means generating turn center signals, for said fixed circular path, and angular position means responsive to said turn center signals for generating an angular position signal representative of the angular position of said aircraft on said fixed circular path.

2. The apparatus of claim 1 in which said turn center means comprises, a. difference means providing a difference signal representative of the difference between said inbound and outbound courses, b. distance means responsive to said turn radius signal and said difference signal providing a distance signal representative of the distance of said waypoint to a point of tangency of said fixed circular path on said inbound course, and c. turn center computing means responsive to said distance signal, said turn radius signal and a signal representative of said inbound course for generating said turn center signals in accordance therewith.

3. The apparatus of claim 2 in which a. said difference means comprises means for computing the function $$dU = U_2 - U_1$$

b. said distance means comprises means for computing the function $$F_7 = D = TR \tan(dU/2)$$

and c. said turn center computing means comprises means for computing the function $$NTCW = -D \cos U_1 - TR \sin U_1$$

$$ETCW = -D \sin U_1 + TR \cos U_1$$

where $U_1, U_2$ = said inbound and outbound courses respectively $dU$ = said difference signal $TR$ = said turn radius signal $D$ = said distance signal $NTCW, ETCW$ = said turn center signals representing the north and east coordinates of said turn center with respect to said waypoint respectively.

4. The apparatus of claim 2 further including, a. VOR/DME computing means for providing first position signals representative of the position of said aircraft with respect to a VOR/DME station, b. waypoint computing means for providing second position signals representative of the position of said waypoint with respect to said VOR/DME station, and c. combining means responsive to said first and second position signals and said turn center signals for providing further position signals representative of the position of said aircraft with respect to said turn center, d. said angular position means being responsive to said further position signals for generating said angular position signal.

5. The apparatus of claim 4 in which said combining means comprises, a. first combining means for combining said first and second position signals for providing third position signals representative of the position of said aircraft with respect to said waypoint, and b. second combining means for combining said third position signals and said turn center signals for providing said further position signals.

6. The apparatus of claim 5 in which a. said difference means comprises means for computing the function $$dU = U_2 - U_1$$

b. said distance means comprises means for computing the function $$F_7 = D = TR \tan(dU/2)$$

and c. said turn center computing means comprises means for computing the function $$NTCW = -D \cos U_1 - TR \sin U_1$$

$$ETCW = -D \sin U_1 + TR \cos U_1$$

where $U_1, U_2$ = said inbound and outbound courses respectively $dU$ = said difference signal $TR$ = said turn radius signal $D$ = said distance signal $NTCW, ETCW$ = said turn center signals representing the north and east coordinates of said turn center with respect to said waypoint respectively.

7. The apparatus of claim 6 in which a. said VOR/DME computing means comprises means for providing first position signals NAV and EAV representative of the north and east coordinates respectively of said position of said aircraft with respect to said VOR/DME station, b. said waypoint computer means comprises means providing second position signals NWV and EWV representative of the north and east coordinates respectively of said position of said waypoint with respect to said VOR/DME station, c. said first combining means comprises means for computing the function $$NAW = NAV - NWV$$

$$EAW = EAV - EWV$$

and d. said second combining means comprises means for computing the function $$NTCA = NTCW - NAW$$

$$ETCA = ETCW = EAW$$

where

NAW, EAW = said third position signals representing the north and east coordinates respectively of said position of said aircraft with respect to said waypoint and NTCA, ETCA = said further position signals representing the north and east coordinates respectively of said position of said aircraft with respect to said turn center.

8. The apparatus of claim 7 in which said angular position means comprises means for computing the function $$F_9 = T_1 = \tan^{-1}(NTCA/ETCA)$$

where $T_1$ = said angular position signal.

9. The apparatus of claim 8 including further VOR/DME computing means for providing a track angle signal representative of the track angle of said aircraft.

10. The apparatus of claim 9 in which said deviation means comprises
 a. cross track error means responsive to said further position signals and said turn radius signal for generating a cross track error signal in accordance therewith with respect to said fixed curved path,
 b. track angle error means responsive to said angular position signal and said track angle signal for generating a track angle error signal in accordance therewith with respect to said fixed curved path, and
 c. steering signal means responsive to said cross track error signal, said track angle error signal and said bank angle command signal for providing a steering signal in accordance therewith with respect to said fixed curved path, and
 d. said cross track error signal, said track angle error signal and said steering signal comprising said deviation correction signals.

11. The apparatus of claim 10 in which
 a. said cross track error means comprises means for computing the function $$F_{11} = XTK = TR - (NTCA^2 + ETCA^2)^{\frac{1}{2}} \text{ for clockwise turns, or}$$

$$F_{11} = XTK = (NTCA^2 + ETCA^2)^{\frac{1}{2}} - TR \text{ for counterclockwise turns}$$

b. said track angle error means comprises means for computing the function $$F_{10} = TKE = (T + 90°) - TA \text{ for clockwise turns}$$

$$F_{10} = TKE = (T - 90°) - TA \text{ for counter clockwise turns}$$

and c. said steering signal means comprises means for computing the function $$P_c = P + k_1 XTK + k_2 TKE$$

where
XTK = said cross track error signal
TKE = said track angle error signal
TRACK ANGLE = said track angle of said aircraft
$P_c$ = said steering signal
$P_m$ = said bank angle command signal
$K_1, k_2$ = gain terms.

12. The apparatus of claim 4 including further VOR/DME computing means for providing a track angle signal representative of the track angle of said aircraft.

13. The apparatus of claim 12 in which said deviation means comprises
 a. cross track error means responsive to said further position signals and said turn radius signal for generating a cross track error signal in accordance therewith with respect to said fixed curved path,
 b. track angle error means responsive to said angular position signal and said track angle signal for generating a track angle error signal in accordance therewith with respect to said fixed curved path, and
 c. steering signal means responsive to said cross track error signal, said track angle error signal and said bank angle command signal for providing a steering signal in accordance therewith with respect to said fixed curved path,
 d. said cross track error signal, said track angle error signal and said steering signal comprising said deviation correction signals.

14. The apparatus of claim 1 in which said deviation means comprises
 a. cross track error means coupled to said fixed curved path means for generating a cross track error signal with respect to said fixed curved path,
 b. track angle error means coupled to said fixed curved path means for generating a track angle error signal with respect to said fixed curved path, and
 c. steering signal means responsive to said cross track error signal, said track angle error signal and said bank angle command signal for providing a steering signal in accordance therewith with respect to said fixed curved path,
 d. said cross track error signal, said track angle error signal and said steering signal comprising said deviation correction signals.

15. The apparatus of claim 14 further including an automatic flight control system responsive to said steering signal for controlling said aircraft about the roll axis thereof in response to said steering signal.

16. The apparatus of claim 14 further including a flight director system responsive to said steering signal and including an attitude director indicator with the lateral steering cue thereof driven by said steering signal.

17. The apparatus of claim 14 further including a horizontal situation indicator responsive to said cross track error signal and said track angle error signal with the lateral deviation and the commanded heading cues thereof driven by said cross track error signal and said track angle error signal respectively.

18. An apparatus for transitioning an aircraft from an inbound course to an outbound course of a waypoint, said waypoint surrounded by a regulated band of airspace within which a travel of inbound and outbound air traffic is constrained to fly, said apparatus comprising;

a. curved path means for computing a fixed circular transition path from said inbound course to said outbound course, said transition path being tangential to said inbound and said outbound courses, b. bank bias means for generating a bank angle command signal for maintaining said aircraft on said fixed circular path, c. deviation means generating deviation correction signals with respect to said fixed circular path for constraining said aircraft to fly along said fixed circular path in transitioning from said inbound to said outbound course, d. altitude signal generating means for generating an altitude signal representative of the altitude of said aircraft, e. means for generating a zone designation signal based on said altitude signal, and f. means for generating a course change signal representative of a course angle change between said inbound and outbound courses means for combining said zone designation signal and said course signal for generation a maximum cross track error signal representative of a maximum deviation allowable from said inbound and outbound courses based on said altitude signal.

19. The apparatus of claim 18 wherein said means for generating said turn radius signal includes means combining said maximum cross track error signal and said course change signal for generating said turn radius signal.

20. The apparatus of claim 19 wherein said means for generating said zone designation signal include means for computing the function $$F_{13} = ZDS = EZ \text{ if } ALT > EZA$$

$$F_{13} = ZDS = TZ \text{ if } ALT < TZA$$

wherein
    ZDS = zone designation signal
    EZ = regulatory defined enroute altitude zone
    TZ = regulatory defined terminal altitude zone
    ALT = aircraft altitude signal
    EZA = regulatory enroute zone altitude limit
    TZA = regulatory terminal zone altitude limit 21. The apparatus of claim 20 wherein said means for generating said maximum cross track error signal include means for computing the function $$F_{12} = MXTK = k_3(dU) \text{ if } ZDS = EZ$$

$$F_{12} = MXTK = k_4(dU) \text{ if } ZDS = TZ$$

wherein
    MXTK = maximum cross track error signal
    ZDS = zone designation signal
    EZ = enroute altitude zone
    TZ = terminal altitude zone
    $k_3$ = constant for enroute altitude zone
    $k_4$ = constant for terminal altitude zone
    dU = angle of inbound and outbound course change 22. The apparatus of claim 21 wherein said means for generating said turn radius signal includes means for computing the function $$F_{16} = TR = MXTK/[1 - \text{cosine } (dU/2)]$$

wherein
    TR = turn radius
    MXTK = maximum cross track error signal
    dU = course change angle 23. The apparatus of claim 22 wherein said means for generating said bank angle command signal include means for computing the function $$F_{15} = P_m = \text{arc tangent } [VG \cdot VG/(TR \cdot g)]$$

wherein
    $P_m$ = bank angle command signal
    VG = aircraft ground speed signal
    TR = turn radius signal
    g = gravity constant 24. An area navigation system for transitioning an aircraft along a track from an inbound course to an outbound course of a area navigation waypoint, said waypoint surrounded by a protected airspace width within which the travel of inbound and outbound air traffic is constrained to fly, said apparatus comprising;

a. means for generating an altitude signal representative of the altitude of said aircraft, b. means for generating a velocity signal representative of said aircraft ground speed, c. means for generating a course change signal representative of a course angle change between said inbound and outbound courses, d. means utilizing said altitude signal for generating a zone designation signal representative of an enroute or terminal zone of said aircraft, e. means combining said course change signal and said zone designation signal for generating a maximum cross track error signal representative of a maximum distance that an aircraft will deviate from an inbound course or outbound course, f. means combining said course change signal and said maximum cross track error signal for generating a turn radius signal representative of the radius required for said aircraft to fly a fixed curved path along said track within said protected airspace width, g. means combining said course change signal and said turn radius signal for generating a distance signal representative of the distance from said waypoint to a point of tangency of said fixed curved path on said inbound course, h. means combining said turn radius signal and said velocity signal for generating a bank angle bias command signal representative of the bank angle of said aircraft flying along said fixed curved path.

\* \* \* \* \*